United States Patent
Grosspietsch et al.

[11] Patent Number: 6,029,979
[45] Date of Patent: Feb. 29, 2000

[54] SEALING ARRANGEMENT

[75] Inventors: Wolfgang Grosspietsch, Schwienfurt; Thomas Otto, Gochsheim; Gottfried Mader, Ebelsbach; Olaf Pagels, Bergrheinfeld; Thomas Riess, Mürsbach; Volker Stampf, Schweinfurt, all of Germany

[73] Assignee: Mannesmann Sachs AG, Schweinfurt, Germany

[21] Appl. No.: 09/016,812

[22] Filed: Jan. 30, 1998

[30] Foreign Application Priority Data

Jan. 30, 1997 [DE] Germany ............................ 197 03 355

[51] Int. Cl.⁷ ...................................................... F16J 15/32
[52] U.S. Cl. .......................... 277/434; 277/436; 277/549; 277/553; 277/560; 277/566
[58] Field of Search ...................................... 277/549, 572, 277/560, 551, 566, 562, 565, 582, 553, 434, 557, 436

[56] References Cited

U.S. PATENT DOCUMENTS

| | | | |
|---|---|---|---|
| 2,509,436 | 5/1950 | Isenbarger | 286/26 |
| 3,272,521 | 9/1966 | McNenny | 277/205 |
| 3,854,737 | 12/1974 | Gilliam, Sr. | 277/436 |
| 3,975,125 | 8/1976 | Mizutani et al. | 418/142 |
| 4,231,578 | 11/1980 | Traub . | |
| 4,231,579 | 11/1980 | Scannell | 277/436 |
| 4,371,177 | 2/1983 | Bahr et al. . | |
| 4,475,738 | 10/1984 | Eicher et al. . | |
| 4,490,915 | 1/1985 | Burkhardt | 33/125 R |
| 4,900,042 | 2/1990 | Genda | 277/549 |
| 5,140,904 | 8/1992 | Schonlau | 92/27 |
| 5,420,386 | 5/1995 | Reinelt | 200/302.2 |
| 5,507,505 | 4/1996 | Von-Arndt et al. | 277/560 |
| 5,590,887 | 1/1997 | Senda et al. | 277/436 |

FOREIGN PATENT DOCUMENTS 898282  3/1961  United Kingdom .

*Primary Examiner*—Anthony Knight
*Assistant Examiner*—Alison K. Pickard
*Attorney, Agent, or Firm*—Cohen, Pontani, Lieberman & Pavane

[57] ABSTRACT

A sealing arrangement for providing a seal between a component and a cylinder in which the component is inserted includes a sealing ring supported in the axial direction in a circumferential slot on the component. The sealing ring has at least one static and one dynamic sealing lip. The sealing lips rest radially on corresponding sealing surfaces of the component and the cylinder. To reduce the noise generated during movement of the component in the cylinder, the geometrical shape of at least of one of the sealing lips is asymmetrical in the axial and/or radial direction with respect to a longitudinal axis of the component or a plane perpendicular to the longitudinal axis of the component, or cavities are distributed around a circumference of a base body portion of the sealing ring.

12 Claims, 5 Drawing Sheets

SEALING ARRANGEMENT

BACKGROUND OF THE INVENTION

1. Field of the Invention

The invention relates to a sealing arrangement having a sealing ring supported in the axial direction within a slot around a shaft or piston and having a sealing lip, whereby the sealing lip rests radially on a corresponding sealing surface of a cylinder in which the shaft of a piston is inserted.

2. Description of the Related Art

Prior art seal rings, which are at least partly rubber-elastic and are used in sealing arrangements where the ring is inserted in a slot around a shaft or a piston, include a dynamic and a static sealing lip which rest on a plane that is perpendicular to a direction of movement during a translatory movement and is perpendicular to a rotational axis during a rotatory movement. In the circumferential direction, the cross-section as well as the radial and axial rigidity of the seal ring is substantially constant.

These prior art dynamic sealing arrangements generate noise during their movement. The lower the ambient noise level is in the environment they are being used, the more disturbing the generated noise is.

SUMMARY OF THE INVENTION

The object of the invention is to create a sealing arrangement for a shaft or piston which minimizes noise during operation.

This object is attained in a generic sealing arrangement by a seal ring having a geometry seen around the circumference that is asymmetrical in the axial and/or radial direction.

The generic sealing arrangement of the present invention represents a conscious deviation from conventional design criteria. During operation, a reduction of vibration amplitudes and/or a shifting of frequency is attained compared to the prior art sealing rings. By suitable variation of the asymmetry in the axial and/or radial direction, the noise behavior of the seal ring is adjustable to particular applications.

To achieve the asymmetry of the present invention, either the sealing ring itself is structurally embodied in an asymmetrical fashion, or the sealing ring can be installed in the sealing arrangement in such a way as to create the asymmetry.

If a conventional sealing ring is used, an annular disk with a variable thickness around the circumference is preferably placed between the conventional sealing ring and an axial support surface. Thanks to the wave-like embodiment of the annular disk, the sealing edges of the respective sealing lips do not lie on the same circumferential line.

A different embodiment which attains the same success includes an undulate spring placed between the sealing ring and the axial support surface, instead of the annular disk.

The sealing edge may also be moved away from a circumferential line, even though the sealing ring is embodied in rotationally symmetrical fashion, by arranging the sealing surfaces eccentrically to each other with respect to an axis of the shaft or piston. The sealing lip in the narrower available space determined by the offset created by the eccentricity is further compressed relative to the sealing lip that is diametrically opposite thereto, so that the sealing edge of the former is moved farther axially outward. The latter sealing lip, in the diametrically opposite area, is more relaxed, so that the sealing lip moves farther axially inward. Without the eccentricity, the sealing surfaces would run coaxially to each other.

Another embodiment of the sealing arrangement in which a conventional sealing ring can be used includes using a shaft or piston with a non-circular radially inner sealing surface. Preferably, the sealing surface is crowned in its cross-section such that the sealing surface comprises points having a greater radius positioned between points having a smaller radius. The crowned cross-section may be embodied in the form of a spherical triangle.

Similarly, the circumferential contour of the inner sealing surface may optionally be embodied in regular fashion with three maximum diameters and three minimum diameters.

When a conventional sealing seat is used, the sealing ring may be embodied such that at least one sealing lip comprises grooving distributed irregularly around the circumference, so that, a plurality of sealing edges is established, relative to an axial direction.

In another embodiment, at least one sealing lip of the sealing ring has a variable axial length around the circumference. In this embodiment, as in the above embodiments, diametrically opposed sealing edges of the sealing ring do not lie on the same circumferential line.

When at least one sealing lip of the sealing ring has an enlarged radius relative to a circumferential line, the sealing ring is further compressed at this point. The further compression of the sealing ring caused the sealing edge of the enlarged portion of the sealing ring to shift axially outward relative to a diametrically opposite sealing edge, or causes the sealing edge in the compressed area to become wider.

The same effect can be attained when at least one sealing lip is attached eccentrically to the rotationally symmetrical base body of the seal.

The object of the invention may also achieved in a generic sealing arrangement by providing cavities in the base body of the seal, distributed around the circumference. In this embodiment, the axial rigidity of the seal is deliberately reduced at the point or points where the cavities are positioned.

Quantitatively, the features described above are preferably dependent on the operating pressure to which the sealing arrangement is subjected.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
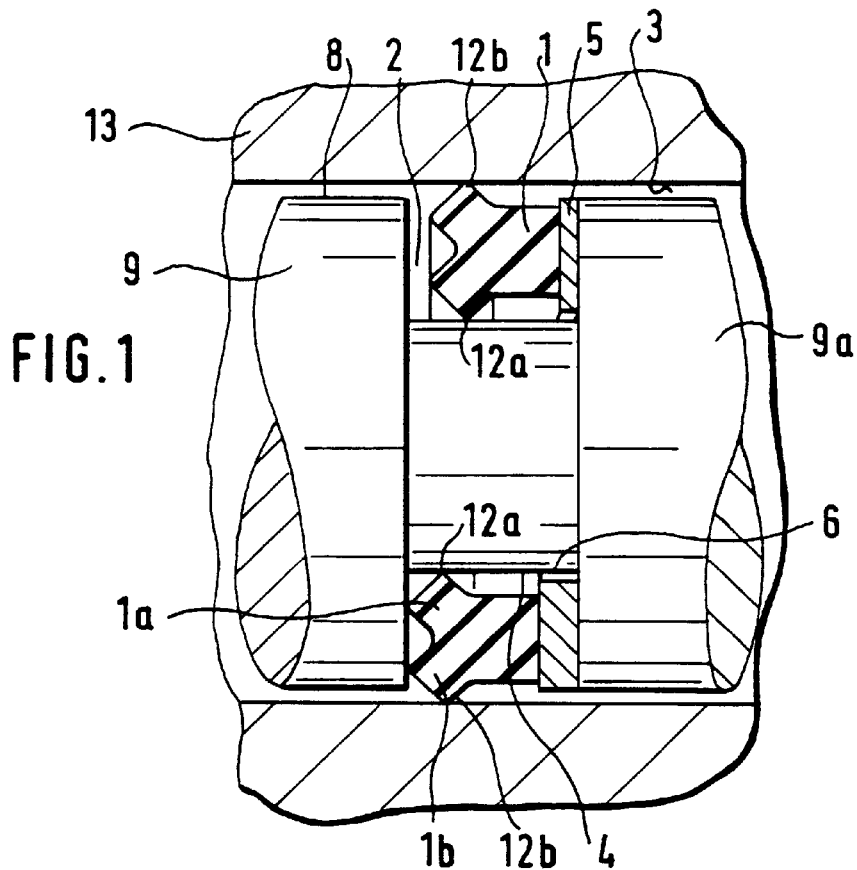
FIG. 1 shows a sectional view along a longitudinal axis of a first embodiment of a sealing arrangement.

Referring first to FIG. 1, a sealing arrangement includes a sealing ring 1 arranged in a slot 2 of a component 9, which may be a shaft or a piston rod. The sealing ring 1 has two radially-acting sealing lips 1a, 1b.

The sealing arrangement is located in a cylinder space 8 within a cylinder 13 or other container in which a seal must be made between the walls of the container and the shaft within the container. If the component 9 is a rotating shaft, the dynamic sealing lip is the radially inner lip 1a. If the component 9 is an oscillating piston rod, the dynamic sealing lip is the radially outer lip 1b. The same is true if component 9 is a stationary shaft and the surrounding cylinder 13 is driven rotationally. An inner sealing surface 4 for the radially inner sealing lip 1a is at the bottom of the slot 2. An outer sealing surface 3 is embodied in the cylinder 13. A support surface 6 of a radial shoulder 9a on the component 9 prevents the seal 1 from moving axially along the component 9.

Figure 2:
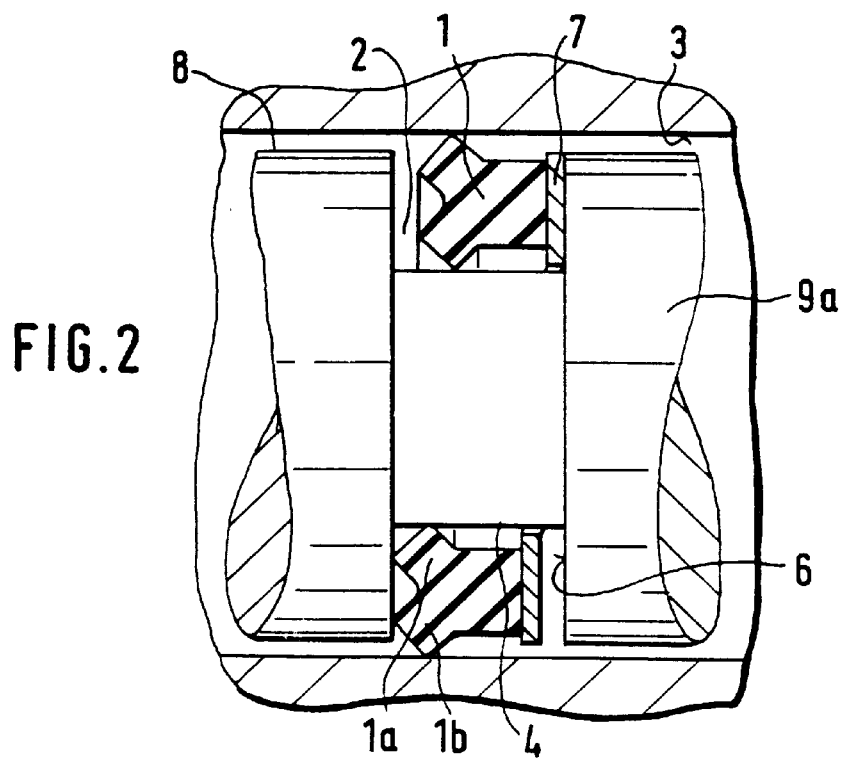
FIG. 2 shows a sectional view along a longitudinal axis of a second embodiment of a sealing arrangement.

FIG. 1 further shows a disk 5 having a variable thickness along the circumferential direction to create a wavy or undulating surface. The disk 5 is placed between the sealing ring 1 and the shoulder 9a. As shown in FIG. 1, the seal 1 is pressed axially forward at the thicker region of the disk 5 and that, as a result, the sealing edges 12a or 12b do not rest on the same circumferential line. FIG. 2 shows that the same effect is attained when an undulate spring 7 is used instead of the disk 5. The deviance of the position of portions of the sealing edges 12a and 12b from the circumferential line reduces the noise generated during movement of the sealing ring 1.

Figure 3B:
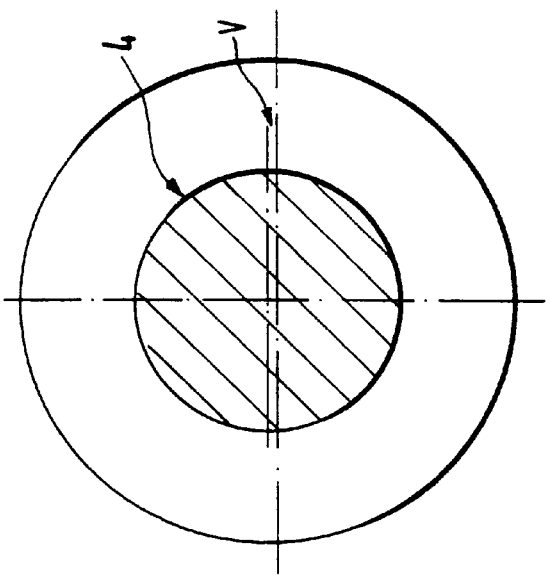
FIG. 3b is a sectional view of the third embodiment of FIG. 3a along line III—III.
Figure 3A:
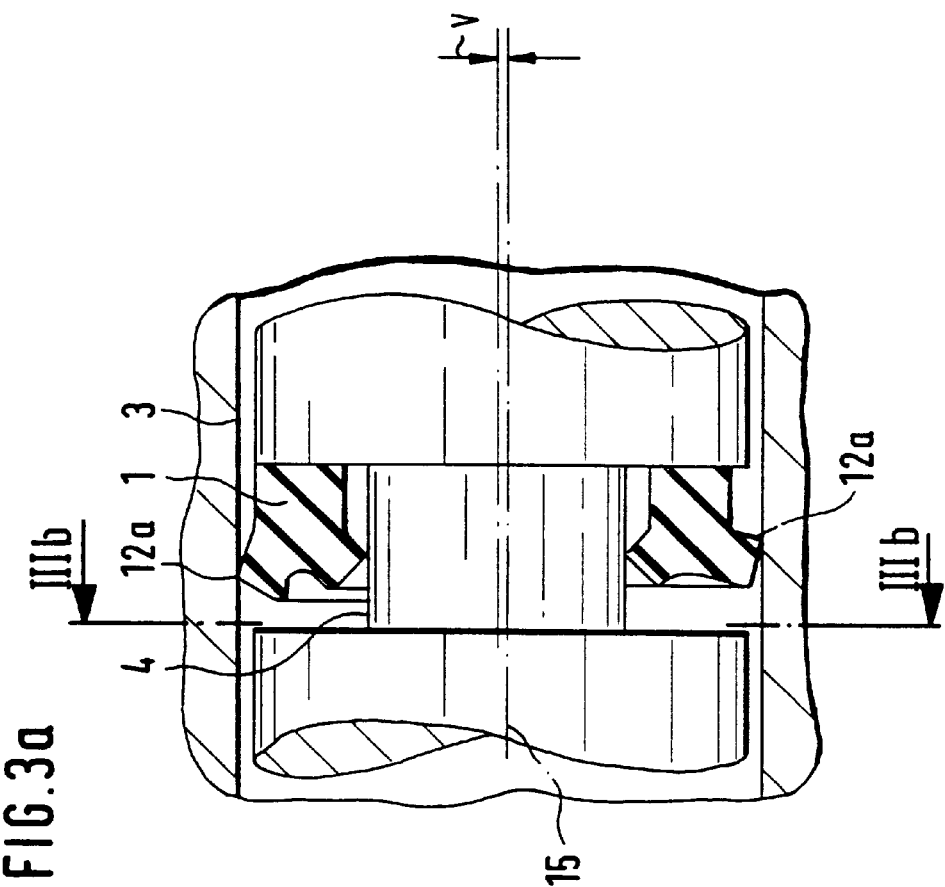
FIG. 3a shows a sectional view along a longitudinal axis of a third embodiment of a sealing arrangement.

With reference to FIGS. 3a and 3b, the slot 2 may be arranged eccentrically relative to a center line 15 of the cylinder 13 and/or the component 9 with an offset V. As a result, various radii are established in the sealing space between the inner sealing surface 4 and the outer sealing surface 3, such that the seal 1 is compressed relative to the concentric arrangement where the radii is smallest (upper half of FIG. 3a) and is broadened in the region diametrically opposite thereto. The variable compression causes the sealing edges 12a and 12b to be variably offset in the axial direction relative to a circumferential line. The variable axial offset reduces the noise generated during movement of the sealing ring 1.

Figure 4B:
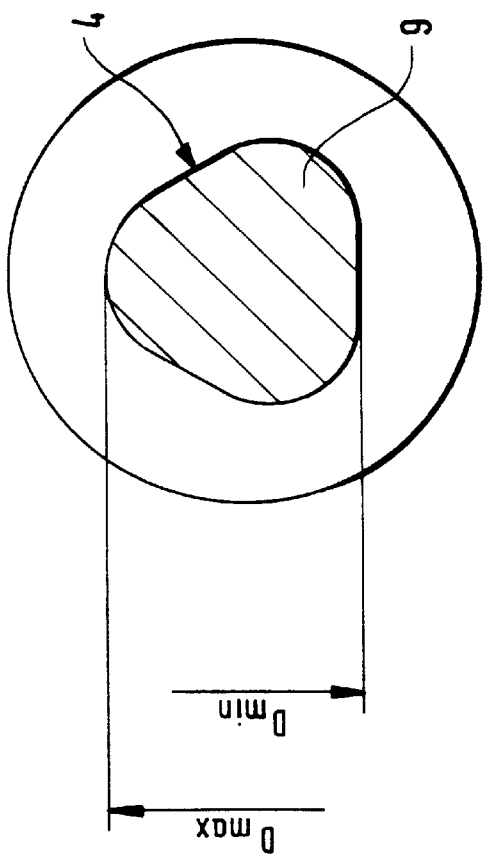
FIG. 4b is a sectional view of the fourth embodiment of FIG. 4a along line IV—IV.
Figure 4A:
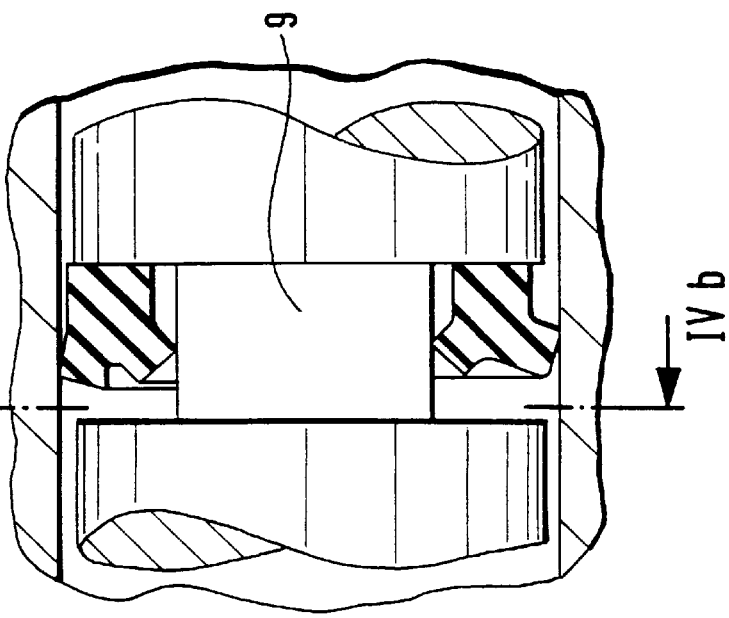
FIG. 4a shows a sectional view along a longitudinal axis of a fourth embodiment of a sealing arrangement.

FIG. 4b shows that the blind end of the slot 2 may be irregularly shaped around the circumference, having three bulges having maximum diameters ($D_{max}$) and three shallow portions having minimum diameters ($D_{min}$). This gives the cross-section a substantially triangular shape with rounded maxima. Referring also to FIG. 4a, this embodiment allows the desired effect to be attained at multiple points around the circumference, three points in specific case shown. Therefore, a radial rigidity of the sealing ring 1 is varied around the circumference of the sealing ring 1. At the bulges, the sealing ring is more compressed than at the shallow portions, thereby creating the same reduced noise effect as in FIGS. 3a and 3b.

Figure 5:
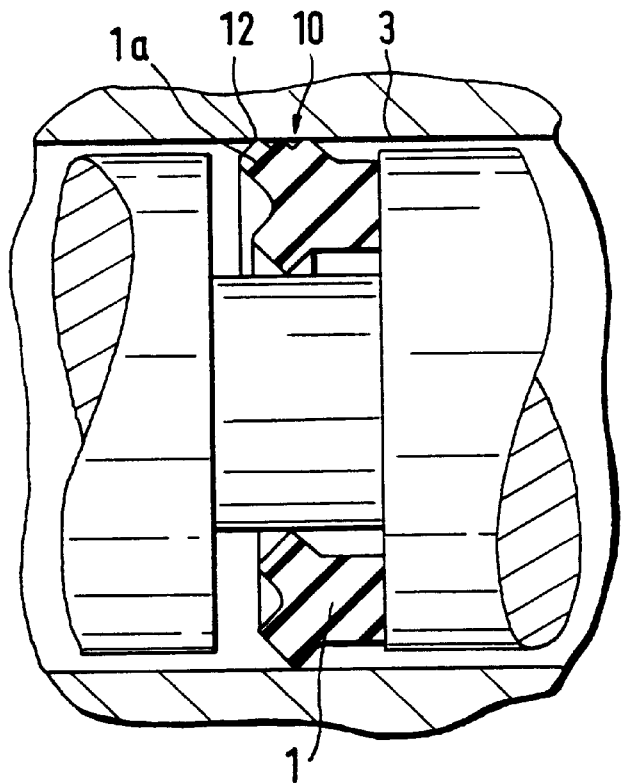
FIG. 5 shows a sectional view along a longitudinal axis of a fifth embodiment of a sealing arrangement.

FIG. 5 shows that the sealing ring 1 has variable amounts of grooves 10 distributed around the circumference on sealing lip 1a. In other words, there are points along sealing lip 1a at which grooving 10 is present and points at which no grooving is present. As a result, a plurality of sealing edges 12 are created on the sealing surface 3 across those points of the circumference that have grooving 10. The variable locations of grooves creates the same reduced noise effect as the embodiment of FIGS. 3a and 3b.

Figure 6:
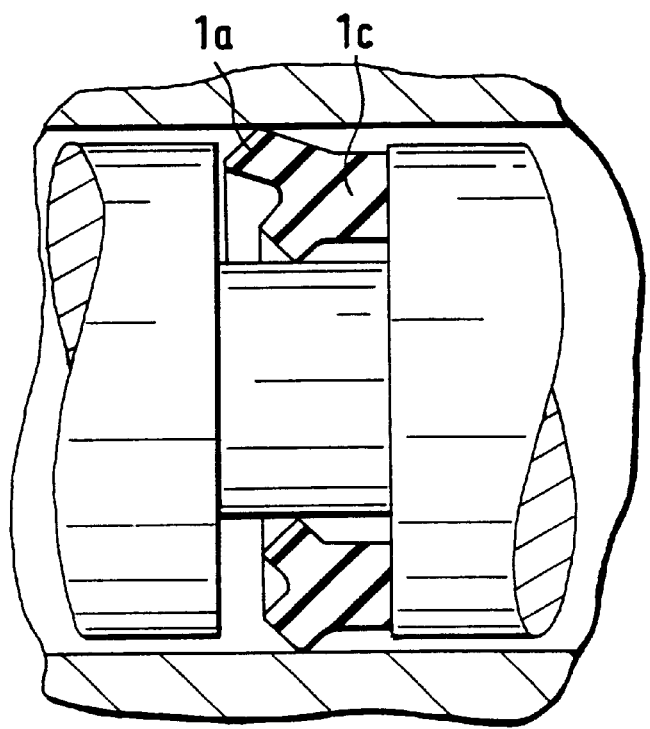
FIG. 6 shows a sectional view along a longitudinal axis of a sixth embodiment of a sealing arrangement.

In the embodiment of FIG. 6, the sealing lip 1a is axially longer across partial areas of the circumference. Otherwise, the body 1c of the sealing ring 1 has a rotationally symmetrical shape. The variable axial length produces the same reduced noise effect as the embodiment of FIGS. 3a and 3b.

Figure 7:
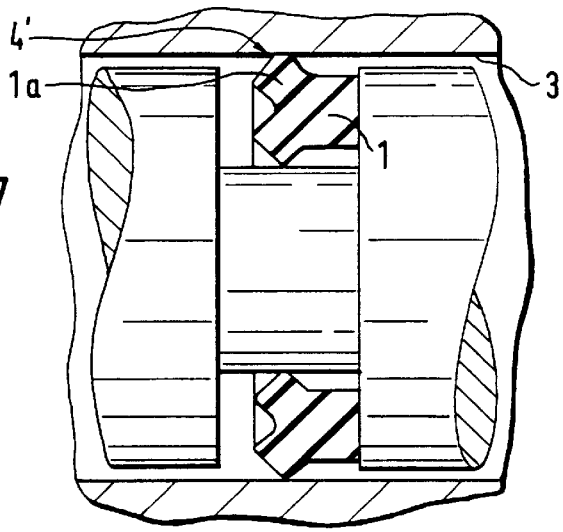
FIG. 7 shows a sectional view along a longitudinal axis of a seventh embodiment of a sealing arrangement.

In the embodiment of FIG. 7, the radius of the dynamic sealing lip 1a can be varied around the circumference of the sealing ring 1. This leads to compression of the sealing lip 1a and to broadening of the support surface on the sealing surface 3. The variable radii of the sealing lip 1a produces the same reduced noise effect as the embodiment of FIGS. 3a and 3b.

Figure 8:
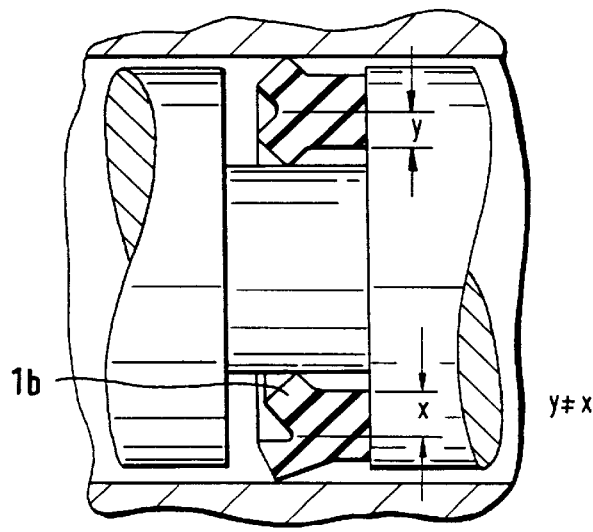
FIG. 8 shows a sectional view along a longitudinal axis of an eighth embodiment of a sealing arrangement.

Referring to FIG. 8, inner sealing lip 1b may also be attached eccentrically, such that the distance x shown in FIG. 8 differs from the diametrically opposite distance y. The variable differences between distances x and y produces the same reduced noise effect as the embodiment of FIGS. 3a and 3b.

Figure 9:
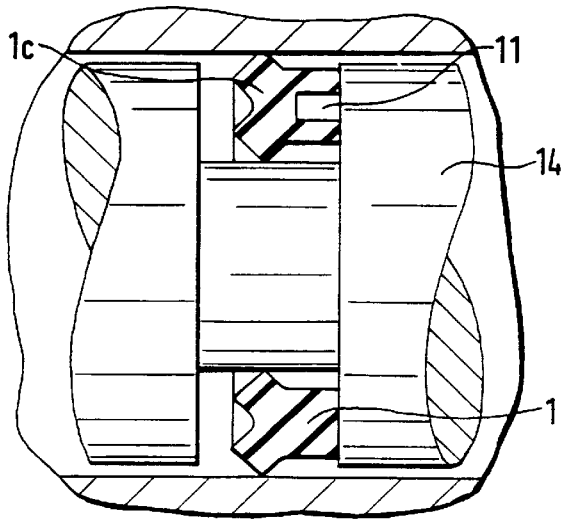
FIG. 9 shows a sectional view along a longitudinal axis of an ninth embodiment of a sealing arrangement.

With reference to FIG. 9, another sealing arrangement according to the invention includes cavities 11 distributed around the circumference of the sealing ring 1, on the side facing a shoulder 14 of the component 9. This embodiment attains discontinuous rigidity in the radial and/or axial direction. The cavities 11 may be distributed regularly or irregularly around the circumference. The discontinuous rigidity produces the same reduced noise effect as the embodiment of FIGS. 3a and 3b.

The invention is not limited by the embodiments described above which are presented as examples only but can be modified in various ways within the scope of protection defined by the appended patent claims.

We claim:

1. A sealing arrangement for providing a sealing connection between an outer circumference of a component and an inner wall of a cylinder which surrounds the outer circumference of the component comprising:

a sealing ring mounted along a circumferential path in a circumferential slot on said component and having a first sealing lip in sealing contact with said inner wall and a second sealing lip in sealing contact with said slot, wherein a cross-sectional geometry of at least one of said first sealing lip and said second sealing lip operatively varies in one of an axial dimension and a radial dimension along the circumferential path of said sealing ring to reduce noise generated by said sealing ring during translators motion of the component relative to the cylinder.

2. The sealing arrangement of claim 1, further comprising a disk having a variable thickness around a circumference of the disk and positioned between the sealing ring and an axial support surface of said slot.

3. The sealing arrangement of claim 1, further comprising an undulate spring positioned between the sealing ring and an axial support surface of said slot.

4. The sealing arrangement of claim 1, wherein said sealing ring is rotationally symmetric about the component and a first sealing surface of said first sealing lip is arranged eccentric to a second sealing surface of said second sealing lip.

5. The sealing arrangement of claim 1, wherein a second sealing surface of said second sealing lip is non-circular.

6. The sealing arrangement of claim 5, wherein said second sealing surface of said second sealing lip comprises a crowned cross-section.

7. The sealing arrangement of claim 5, wherein a circumferential contour of said second sealing surface of said second sealing lip comprises three portions having a maximum diameter ($D_{max}$) and three portions having a minimum diameter ($D_{min}$).

8. The sealing arrangement of claim 1, at least one of the first sealing lip and the second sealing lip comprises a grooving distributed irregularly around a circumference of the sealing ring, such that a plurality of sealing points is established by said at least one of said first sealing lip and said second sealing lip.

9. The sealing arrangement of claim 1, wherein at least one of the first sealing lip and the second sealing lip comprises a varying axial length around a circumference of the sealing ring.

10. The sealing arrangement of claim 1, wherein at least one of the first sealing lip and the second sealing lip comprises a variable radius relative to a circumference of said component.

11. The sealing arrangement of claim 1, wherein at least one of said first sealing lip and said second sealing lip is attached eccentrically to a rotationally symmetrical base portion of said sealing ring.

12. A sealing arrangement for providing a sealing contact between an outer circumference of a component and an inner wall of a cylinder which surrounds the outer circumference, comprising:

a sealing ring inserted into a slot around the outer circumference of the component, said sealing ring comprising a base portion, a first sealing lip operatively connected to said base portion for sealingly contacting said inner wall of said cylinder and a second sealing lip operatively connected to said base portion for sealingly contacting said component; and said base portion comprising cavities operatively distributed around a circumference of said base portion thereby creating alternating areas of higher rigidity and areas of lower rigidity operatively arranged around the circumference of said base portion for reducing noise generated by said sealing ring during translatory movement of the component relative to the cylinder.

* * * * *